(12) United States Patent
Winter

(10) Patent No.: US 8,810,671 B2
(45) Date of Patent: Aug. 19, 2014

(54) CAMERA WITH VOLUMETRIC SENSOR CHIP

(75) Inventor: Marco Winter, Hannover (DE)

(73) Assignee: Thomson Licensing, Issy les Moulineaux (FR)

( * ) Notice: Subject to any disclaimer, the term of this patent is extended or adjusted under 35 U.S.C. 154(b) by 507 days.

(21) Appl. No.: 13/065,141

(22) Filed: Mar. 15, 2011

(65) Prior Publication Data

US 2011/0285882 A1 Nov. 24, 2011

(30) Foreign Application Priority Data

May 19, 2010 (EP) .................................... 10305533

(51) Int. Cl.
*H04N 5/225* (2006.01)

(52) U.S. Cl.
CPC ................................... *H04N 5/2253* (2013.01)
USPC ...................... 348/218.1; 348/335

(58) Field of Classification Search
USPC ............................... 348/218.1, 335
See application file for complete search history.

(56) References Cited

U.S. PATENT DOCUMENTS

| | | | |
|---|---|---|---|
| 6,801,260 B1 * | 10/2004 | Veksland et al. .............. | 348/345 |
| 2005/0030408 A1 | 2/2005 | Ito et al. | |
| 2007/0102622 A1 | 5/2007 | Olsen et al. | |
| 2008/0151089 A1 | 6/2008 | Street et al. | |
| 2010/0001997 A1 * | 1/2010 | Kajikawa et al. ............. | 345/419 |

FOREIGN PATENT DOCUMENTS

| | | |
|---|---|---|
| DE | 102005052176 | 5/2007 |
| EP | 2059058 | 5/2009 |
| EP | 2088572 | 8/2009 |
| EP | 2180510 | 4/2010 |
| WO | WO0072089 | 11/2000 |

OTHER PUBLICATIONS

EP Search Report dated Jul. 14, 2010.

* cited by examiner

*Primary Examiner* — Anthony J Daniels
(74) *Attorney, Agent, or Firm* — International IP Law Group, PLLC

(57) ABSTRACT

A camera using a volumetric sensor chip as an image sensor is proposed. The volumetric sensor chip has three or more sensor areas shaped like simple convex polygons. Light diverting elements are arranged at edges between neighboring sensor areas of the volumetric image sensor chip.

9 Claims, 4 Drawing Sheets

Fig. 1 - Prior Art

CAMERA WITH VOLUMETRIC SENSOR CHIP

This application claims the benefit, under 35 U.S.C. §119 of EP Patent Application 10305533.1, filed 19 May 2010.

FIELD OF THE INVENTION

The present invention relates to a camera with a volumetric sensor chip, and more specifically to a camera that is especially suitable for mobile applications.

BACKGROUND OF THE INVENTION

Today's cameras generally make use of CCD or CMOS elements as light detecting sensors. Due to the production process, e.g. manufacturing from a silicon wafer, these sensors are generally flat. As a consequence, the camera optic needs a special lens to prepare the incoming light for the flat camera sensor. While this lens does not constitute a problem for professional cameras regarding weight and size, the situation is different for camera applications which need a compact camera. For example, portable devices like cell phones or PC/laptop cameras need to be lightweight and small. A camera working without a lens for imaging the incoming light onto a flat camera sensor would thus be desirable.

A known imaging system without the need for an additional lens is the human eye. Due to the spherical shape of the retina no additional lens apart from the eye lens located below the iris is necessary. However, with current semiconductor based production processes it is not possible to produce CCD or CMOS elements on a sphere.

DE 10 2005 052 176 A1 discloses a video camera having a curved sensor area. The curved sensor area is achieved either with a special bundle of optical fibres, which guide the incoming light onto a flat sensor, or by arranging a plurality of individual sensor elements on a spherical surface. While the former solution needs a rather expensive fibre bundle, the latter solution requires a lengthy and difficult production process.

SUMMARY OF THE INVENTION

Accordingly, it is an object of the present invention to propose an alternative design of a camera, which does not require a lens for imaging the incoming light onto the camera sensor.

According to the invention, this object is achieved by a camera with an image sensor, wherein the image sensor is a volumetric sensor chip.

In order to avoid the need for a lens for imaging the incoming light onto the camera sensor, the light sensor is formed by three or more flat sensor elements, which form a volumetric arrangement, i.e. a non-flat arrangement. With this kind of camera a very wide focal distance range is possible, much wider than in comparable compact camera optics using flat sensor chips. At the same time the camera is lightweight and small. Furthermore, as no lens is needed there is no loss of light caused by reflection at the lens surface.

Preferably, the volumetric sensor chip has three or more sensor areas shaped like simple convex polygons. Using such sensor areas allows to easily construct a volumetric sensor chip.

Advantageously, the sensor chip has three triangular sensor areas, preferably three isosceles right triangles. The combination of three isosceles right triangles is the most simple and harmonic structure. In this case the short edges of each sensor area are fully in touch with the short edges of the adjacent sensor areas so that the resulting shape is a geometrical part of a cube. This arrangement is much closer to the shape of an inner sphere than a flat sensor chip.

Alternatively, the volumetric sensor chip has four triangular sensor areas. In this case the sensor areas are no longer right triangles, but still isosceles triangles. In this case the sensor areas advantageously form a pyramid, i.e. half of an octahedron. The use of isosceles triangles has the advantage that there is no loss of wafer area during production.

More generally, the three or more sensor areas preferably have the shape of a part of a Platonic solid or a truncated Platonic solid. Examples of such shapes are a tetrahedron, a part of a dodecahedron, a truncated tetrahedron, a part of a truncated octahedron, etc. Though the production costs increase with the increasing number of parts, especially if the sensor chip fragments have geometrical shapes that do not allow to completely fill the wafer area during production, such shapes are even closer to the shape of an inner sphere.

Advantageously, the camera has a processor for calculating a flat pixel arrangement from detected pixels of the volumetric sensor chip. The processor transforms the pixels of the volumetric arrangement into a flat pixel arrangement as used by conventional picture file formats. In other words, the processor transforms the detected pixels into a pixel arrangement of a virtual sensor chip. During this transformation a correction of the perspective, a correction of the brightness, etc. are performed. Due to manufacturer tolerances the sensor chips may vary a little bit geometrically from sensor body to sensor body. Therefore, it is advantageous to adjust the software parameters for the processor for each manufactured sensor body. This ensures that the assembled camera works in an optimum way. The adjustment is preferably performed automatically, e.g. by applying appropriate test pictures such as chess board patterns.

Preferably, the image sensor has a higher pixel resolution than the pixel resolution of the calculated flat pixel arrangement. The junction of three or more flat sensor elements causes a reduced picture quality at those edges of the sensor elements that are in contact with neighbouring sensor elements. This needs to be compensated by the geometrical pixel transformation to achieve a satisfactory picture quality. Advantageously, for this purpose a higher pixel resolution is used for the sensor elements than the pixel resolution of the resulting virtual picture. Favourably, the higher pixel resolution is supported with an appropriate concealment during the geometrical pixel transformation. Alternatively or in addition, concave cylindrical lenses or other light diverting elements are arranged at the edges between neighbouring sensor elements. These elements direct the incoming light away from the edges towards the sensor area.

Preferably, the camera has a distance sensor for determining a focal distance. The value of the focal distance is taken into account by the processor during the geometrical pixel transformation. In this way the camera is able to support different focal distances. If the processor knows the exact position of the focal distance, it is able to transform the detected pixels into the virtual 2D pixel plane for different focal distances.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

Figure 1:
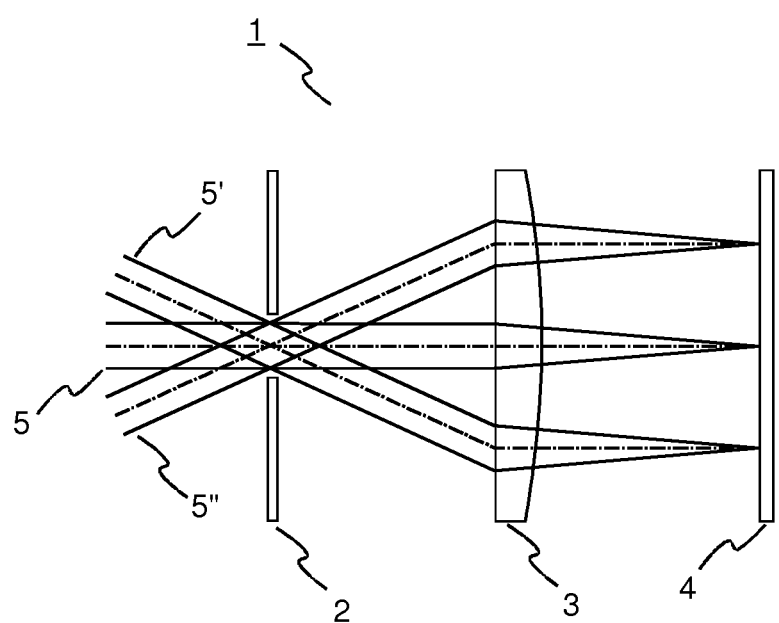
FIG. 1 depicts the principle of a known camera.

The principle of a known camera 1 is depicted in FIG. 1. Light bundles 5, 5', 5" passing through an aperture 2 are imaged by a lens 3 onto a flat sensor chip 4. The space required by such a camera is essentially defined by the necessary distance between the lens 3 and the aperture 2 and the focal length of the lens 3.

Figure 2:
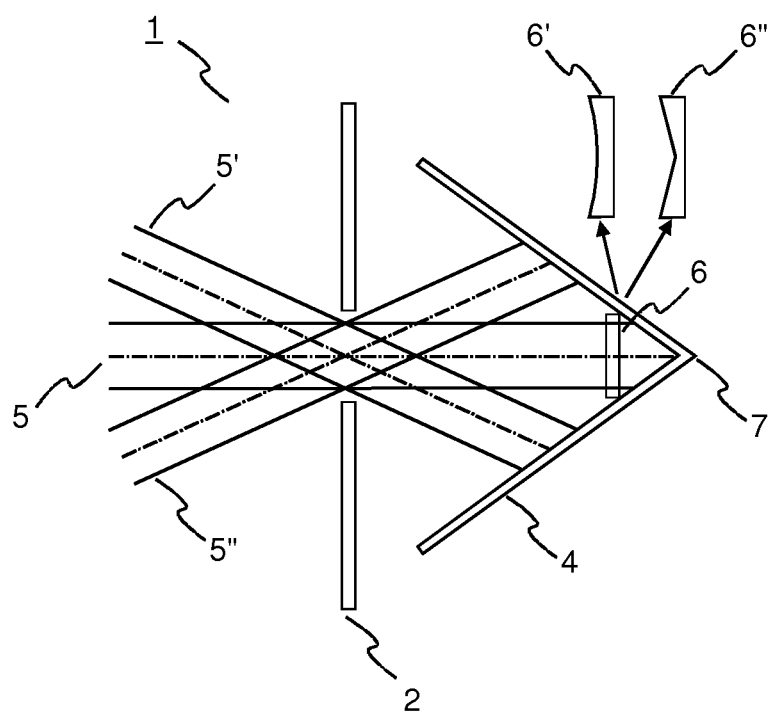
FIG. 2 shows the principle of a camera according to the present invention.

According to the invention, the lens 3 is omitted to achieve a more compact camera design. In this case the camera 1 corresponds essentially to a pinhole camera. For such a camera a spherical sensor would be desirable for optimum image quality. However, spherical sensors are rather expensive and difficult to manufacture. In order to nevertheless enable a satisfactory image quality, the flat sensor chip 4 of FIG. 1 is replaced by a volumetric sensor chip 4. The volumetric sensor chip 4 achieves a better image quality than a flat sensor chip with only a slightly more complex production process. The principle of the camera 1 according to the present invention is schematically depicted in FIG. 2. Optionally a light diverting element 6 is arranged at the edge 7 between neighbouring sensor elements, e.g. a concave cylindrical lens 6' or an 'inverted biprism' 6". This element 6 directs the incoming light away from the edge 7 towards the sensor areas of the sensor chip 4.

Figure 3:
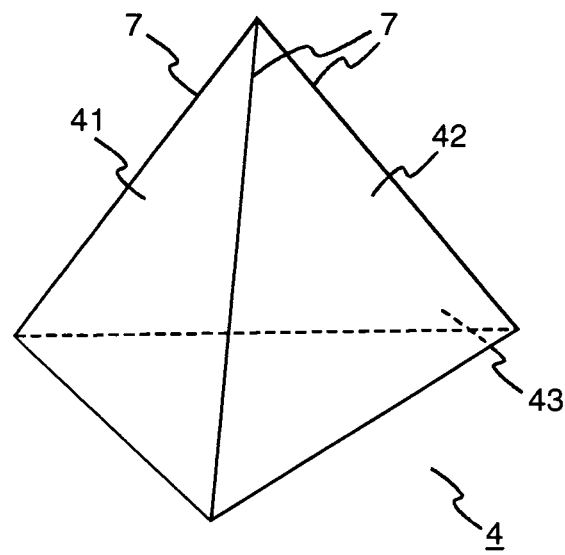
FIG. 3 illustrates a first design of a volumetric sensor chip.
Figure 4:
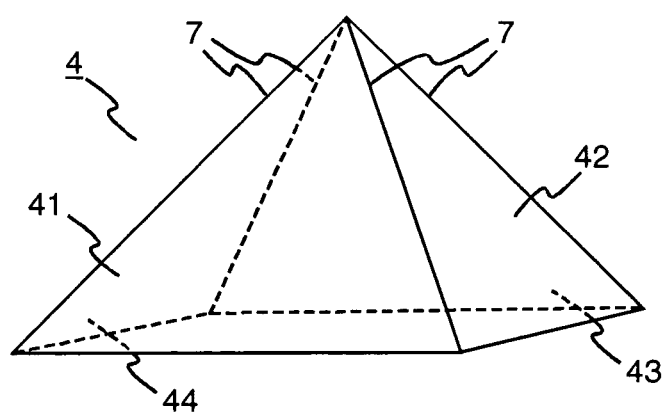
FIG. 4 depicts a second design of a volumetric sensor chip.
Figure 5:
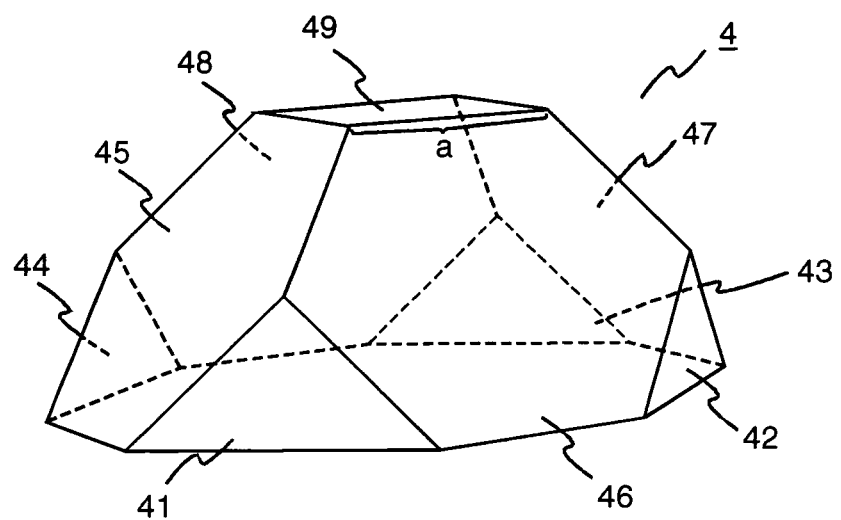
FIG. 5 illustrates a third design of a volumetric sensor chip.

Exemplary designs of the volumetric sensor chip 4 are illustrated in FIGS. 3 to 5.

A first exemplary design of a volumetric sensor chip 4 is depicted in FIG. 3. The volumetric sensor chip 4 is composed of three triangular sensor areas 41, 42, 43 and forms a tetrahedron. If the triangular sensor areas 41, 42, 43 are equilateral triangles, the volumetric sensor chip 4 forms a regular tetrahedron, which is one of the Platonic solids.

A second exemplary design of a volumetric sensor chip 4 is illustrated in FIG. 4. In this case the volumetric sensor chip 4 is composed of four triangular sensor areas 41, 42, 43, 44 and forms a square pyramid, i.e. a pyramid having a square base. The four triangular sensor areas 41, 42, 43, 44 preferably are isosceles triangles, as this simplifies production. If the four triangular sensor areas 41, 42, 43, 44 are all equilateral triangles, the pyramid is a Johnson solid. It can likewise be described as half of a regular octahedron.

A third exemplary design of a volumetric sensor chip 4 is shown in FIG. 5. In this figure for better clarity no reference numerals are shown for the edges between neighboring elements. Here the volumetric sensor chip 4 is composed of nine sensor areas 41 to 49, namely four triangular sensor areas 41, 42, 43, 44, four hexagonal sensor areas 45, 46, 47, 48, and one square sensor area 49. The volumetric sensor chip 4 is a part of a truncated octahedron. A truncated octahedron is constructed from a regular octahedron with a side length $3a$ by the removal of six right square pyramids, one from each point, having both a base side length and lateral side length of a.

The invention claimed is:

1. A camera with a volumetric image sensor chip, the volumetric image sensor chip comprising three of more flat sensor areas for detecting spatially separate parts of an image, wherein light diverting elements are arranged at edges between neighboring sensor areas of the volumetric image sensor chip, the light diverting elements being configured to direct incoming light away from the edges towards the neighboring sensor areas.

2. The camera according to claim 1, wherein the three or more flat sensor areas are shaped like simple convex polygons.

3. The camera according to claim 2, wherein the three or more flat sensor areas have a shape of a part of a Platonic solid or a truncated Platonic solid.

4. The camera according to claim 1, wherein the volumetric image sensor chip comprises three triangular flat sensor areas.

5. The camera according to claim 1, wherein the volumetric image sensor chip comprises four triangular flat sensor areas.

6. The camera according to claim 1, further comprising a processor configured to calculate a flat pixel arrangement from detected pixels of the volumetric image sensor chip.

7. The camera according to claim 6, wherein a pixel resolution of the calculated flat pixel arrangement is smaller than a pixel resolution of the three of more flat sensor areas of the volumetric image sensor chip.

8. The camera according to claim 6, further comprising a distance sensor for determining a focal distance.

9. The camera according to claim 1, wherein the light diverting elements are concave cylindrical lenses of inverted biprisms.

* * * * *